United States Patent [19]
Merrill

[11] 3,865,766
[45] Feb. 11, 1975

[54] PROCESS FOR BODYING ORGANOPOLYSILOXANES

[75] Inventor: Duane F. Merrill, Ballston Spa, N.Y.

[73] Assignee: General Electric Company, Waterford, N.Y.

[22] Filed: Dec. 14, 1973

[21] Appl. No.: 424,774

[52] U.S. Cl........ 260/18 S, 260/37 SB, 260/46.5 R, 260/46.5 G
[51] Int. Cl............................................ C08g 51/72
[58] Field of Search.......... 260/46.5 R, 18 S, 37 SB, 260/46.5 G

[56] References Cited
UNITED STATES PATENTS
3,375,223  3/1968  Merrill ........................... 260/46.5 R
3,786,015  1/1974  Merrill et al. .................... 260/37 SB

*Primary Examiner*—Melvyn I. Marquis
*Attorney, Agent, or Firm*—Donald J. Voss; George B. Finnegan, Jr.; Edward A. Hedman

[57] ABSTRACT

Silanol-containing organopoly-siloxane resins are bodied by effecting controlled condensation in admixture with diatomaceous earth and a metal soap catalyst. The bodied resins have improved heat life and superior cure rates.

26 Claims, No Drawings

PROCESS FOR BODYING ORGANOPOLYSILOXANES

This invention relates to a method for building up the molecular weight of organopolysiloxane resins. More particularly, it concerns bodying such resins in admixture with diatomaceous earth and a metal soap catalyst.

BACKGROUND OF THE INVENTION

Several methods have been available in the prior art for building up the viscosities of silanol-containing organopolysiloxane resins in a controlled manner. This process, known as "bodying," is designed to increase the molecular weight of organopolysiloxane hydrolyzates to make them more valuable in resin applications. During bodying, condensation of silanol radicals are effected in the hydrolyzate to lengthen the shelf life and decrease the cure time. If bodying is not carried out in a well-controlled fashion, however, premature gellation of the organopolysiloxane resin will occur, and cause total loss of the batch.

Britton, et al., U.S. Pat. No. 2,460,805, teach that organopolysiloxane polymers can be bodied with acid activated clays, such as bentonite and other hydrous aluminum silicates. Activation of the clay is accomplished by heat treatment with strong acids, namely sulfuric acid and phosphoric acid. On the other hand, R. N. Meals And F. N. Lewis, "Silicones," Reinhold Publishing Co., (1959), page 134, disclose that bodying can be carried out with metal soap catalysts, such as zinc octoate.

Both methods have disadvantages in practice, however. Acid activated clays appear to function best only if the bodying temperature is raised to the order of 200°C. at which temperature process control becomes difficult — the more useful solvents boil well below this, too; and, with either acid clay bodying or metal soap catalyzed bodying, the shelf life at 25°C. is often less than 3 months. Moreover, in all cases the cure time of the resin is longer than would be desirable, often exceeding 20 41 hours or more, when the resin is combined with conventional curing catalysts, e.g., amines.

A much improved method for bodying such resins is disclosed in Merrill, U.S. Pat. No. 3,375,223, assigned to the assignee of the present application, and incorporated herein by reference. In that method the silanol-containing resin is heated in the presence of a hydrogen chloride activated particulated siliceous material, e.g., diatomaceous earth, and the bodying is carried out efficiently at temperatures substantially lower than that required with acid activated clays. Moreover, because no metal soap catalyst is used at all, the bodied resin is not contaminated with metal ions which, in high amounts, can impair the stability of the cured resin, as well as substantially reduce its shelf life.

The method of bodying resins described in the Merrill patent, while efficient, does provide resins which still have some disadvantages, in common with all of the other silicone resins bodied by prior art procedures. Chief among these is the need to add greater than 0.005% of catalytic metal on resin solids to obtain a fast enough cure. However, all such resins catalyzed with the optimum amount, e.g., 0.03 to 0.06% as iron, degrade in less than one week at 250°–300°C.

It has now been discovered that when silanol-containing organopolysiloxane resins are bodied in admixture with diatomaceous earth (preferably unactivated diatomaceous earth, that is, not acid activated) and a very low level of metal soap catalyst for silanol self-condensation, then bodied resins will be obtained with superior properties. Moreover, when the resins are bodied according to this discovery, then are further catalyzed with as much as 0.06% catalyst calculated as metal, e.g., iron, they exhibit outstanding heat stability. Moreover, the cure rate is excellent: resins that would normally require the addition of 0.06% of catalyst, e.g., as iron to obtain a cure time of less than 10 seconds, cure is less than 5 seconds — without any added catalyst — the only catalyst being the low, residual amount, e.g., 0.001% as iron, used for bodying by the new method of this invention.

DESCRIPTION OF THE INVENTION

According to this invention, there is provided a process for effecting the controlled condensation of silanol radicals in a silanol-containing organopolysiloxane, which comprises:

1. heating at a temperature of between 50°C. and 250°C., a mixture comprising the silanol-containing organopolysiloxane, diatomaceous earth in an amount of from 0.75 to 20% by weight of the silanol-containing organopolysiloxane and a metal soap catalyst in an amount of from 0.0005 to 0.002%, calculated as metal, by weight of the silanol-containing organopolysiloxane; and 2. recovering in organopolysiloxane from the resulting mixture of (1), leaving a viscosity higher than the silanol-containing organopolysiloxane.

The silanol-containing organopolysiloxane will illustratively be a hydrolyzate of the formula

$$(R)_a SiO_{4-a/2}$$

wherein R is selected from a monovalent hydrocarbon radical and a halogenated monovalent hydrocarbon radical and $a$ has a value of from 1 to 1.8, preferably from 1.25 to 1.75 inclusive.

Radicals included by R are, typically, alkyl and chloroalkyl radicals, such as methyl, chloroethyl, propyl, octyl, and the like, aryl and haloaryl radicals, such as phenyl, chlorophenyl, bromophenyl, dichlorophenyl, diphenyl, naphthyl, tolyl, xylyl, and the like. R can be more than one radical, e.g., two or more of the foregoing. Preferably the organopolysiloxane will be a methylphenylpolysiloxane.

The silanol-containing material which is bodied according to this invention can be made, for example by hydrolyzing an organohalosilane of the formula:

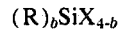
$$(R)_b SiX_{4-b}$$

wherein R is as defined above, $b$ is an integer equal to 1 or 2, and X is a halogen, e.g., chloro, bromo, etc. Specific examples useful organohalosilanes are methyltrichlorosilane, dimethyldichlorosilane, methyphenyldichlorosilane, phenyltrichlorosilane, diphenyldichlorosilane, and the like.

Preferably, mixtures of the above-mentioned organohalosilanes will be employed to produce resins bodied in this invention. Hydrolysis of the mixture of halosilanes of the above formula can be carried out by well known methods. One description is found in Rochow, "Chemistry of the Silicones" (2nd Edition), John Wiley and Sons, Inc., New York, p.90–94. Such procedures involve the addition of water to the organohalosilanes or mixtures thereof with aliphatic alcohol. One particularly useful procedure involves hydrolysis in a two phase system using a water immiscible organic solvent and acetone in the media. This is described in the co-pending application of D. F. Merrill, Ser. No. 115,715, filed on Feb. 16, 1971, assigned to the assignee of the present application, and incorporated herein by reference. The preparation of such preferred starting materials will be described in detail in the Examples hereinafter. Preferably the methylphenylpolysiloxanes will be composed of chemically combined methylsiloxy units and diphenylsiloxy units.

The diatomaceous earth is a form of particulated siliceous material containing silicon dioxide or its hydrates. Unlike clays, it is substantially free of chemically combined aluminum. The diatomaceous earth is a heterogeneous solid material having a high surface area, of at least 0.2 m.$^2$/g. Diatomaceous earth is also known as infusorial earth and/or siliceous earth, fossil flour and kieselguhr. It is composed of siliceous fragments of various species of diatoms, and is a light gray to pale buff powder which is insoluble in water, acids and dilute alkali. It is commercially available from a number of sources, e.g., under the Tradenames Celite and Super-Cell. A typically useful form is known as Celite 545, and is available from Johns-Manville Corp.

It is important to use diatomaceous earth which has not been pretreated or activated, especially with acid, and particularly with hydrochloric acid, in the present process.

Any of the well known metal soap catalysts used for condensing silanol-containing organopolysiloxane resins can be used herein. (See Meals and Lewis, above). These can generally comprise a metal salt of an organic acid having greater than about five carbon atoms, preferably from 6 to 30 carbon atoms, e.g., capric, caproic, octoic, isooctoic, deconoic, octadecanoic, etc., in which the metal is an ionic form of iron, zinc, tin, cobalt, lead, nickel, cadmium, and the like. Preferably, the metal component will be iron, zinc, tin or cobalt. Especially preferably, these will be used in the form of octoates. Most preferably, the metal soap catalyst will be iron octoate.

In practicing the invention, a mixture of the silanol-containing organopolysiloxane, the diatomaceous earth and the metal soap catalyst is heated. The bodied organopolysiloxane is separated at a higher viscosity.

The order of addition of the various ingredients to the bodying mixture, which can also include a suitable organic solvent and the like, is not critical. Preferably, the diatomaceous earth and metal soap catalyst are added to an organic solvent solution of the silanol-containing organopolysiloxane resin. Especially preferably, any excess acidity in the organic solvent solution will be removed, e.g., by a water wash, before adding the diatomaceous earth and the catalyst.

The diatomaceous earth can be used in the bodying mixture at from 0.75 to 50% by weight of the organopolysiloxane, and preferably from 0.75 to 20%. Suprisingly, the advantageous results are not obtained with 0.5% of the diatomaceous earth. The best combination of efficiency and effectiveness is observed with 1% of unactivated diatomaceous earth, based on resin solids.

It is important to use an unusually low amount of the metal soap catalyst, the amount being calculated on the weight of contained metal and based on the weight of silanol-containing organopolysiloxane in the mixture. The useful amount will range from about 0.0005 to about 0.002%, calculated as metal, by weight of resin solids. The best combination of effectiveness is seen at about 0.001%, as metal, based on resin solids. Below 0.0005%, the cure rate of the bodied resin will be too slow; and above 0.002%, the heat stability of the bodied resin will tend to be adversely affected.

The mixture of silanol-containing organopolysiloxane, the diatomaceous earth and the metal soap catalyst can be heated to a temperature between 50°C. and 250°C. to effect the desired molecular weight increase in the resin. It is preferred to use a suitable organic solvent in the mixture to facilitate the polymerization and separation of the resulting bodied organopolysiloxane. Suitable organic solvents include, for example, toluene, xylene, tetrahydrofuran, butyl acetate, butyl ether, trichloroethylene, and the like. Best results are obtained if a solution of the silanol-containing organopolysiloxane resin is used in which the concentration of the resin is at best 50% by weight, based on the solution. Preferably, a solution of organopolysiloxane resin in organic solvent is employed having a concentration of 55 to 90% by weight of resin, based on the total weight of the solution.

Body time can vary from as little as ½ hour to 24 hours or more depending on the nature of the silanol-containing organopolysiloxane, temperature, catalyst type and amount, surface area of the diatomaceous earth, the viscosity desired, and the like. A convenient method for determining the point at which the organopolysiloxane resin has reached a predetermined increase in viscosity is to use a Zahn viscosimeter. The Zahn viscosimeter, as described in General Electric Review, No. 40,35–6 (1937) measures viscosity by duration of flow through an orifice. For example, if a No. 5 Zahn viscosimeter is used, the flow time, at reflux temperatures, of a solution of unbodied silanol-containing organopolysiloxane at 50% solids, will typically range from 3 to 5 seconds. After bodying, the flow time under the same conditions, will increase from 2 to 12-fold. This can correspond to an increase in resin viscosity of the bodied organopolysiloxane as compared to the unbodied resin, of 2 to 60-fold. At the desired viscosity, based, e.g., on a predetermined Zahn flow time, heating is terminated and the mixture is cooled, e.g., to 25°–30°C. The concentration of resin can be adjusted, e.g., by adding solvent, and any particulate material, e.g., diatomaceous earth can then be removed, e.g., by filtration.

While modifications of the Zahn techniques are valuable for following the process, especially precise control of the process is achieved if the viscosity of the unbodied resin, the bodied resin and the resin solutions is measured in a viscosimeter, such as one of the well known Bookfield-type. These give viscosity values, relatively independently of shearing effects, in centipoises at any convenient temperature, e.g., 25°C. or 30°C. It has been found that the unbodied resin has a viscosity of from about 10 to about 50, and typically 20, centipoises (cps.) at 25°C.; and that the bodied resin has a viscosity of about 750 to 1,500, typically 1,000 cps. at 25°C. After dilution to 50% solids, the viscosity of the bodied resin will be from about 200 to about 700, typically 300 – 500 cps. at 25°C.

DESCRIPTION OF THE PREFERRED EMBODIMENTS

The following examples are given by way of illustration and not limitation. All parts are by weight. Viscosities are at 25°C.

EXAMPLE 1

There is added to a solution of 1,800 parts of acetone in 6,000 parts of water, a silane blend consisting of 970 parts of phenyltrichlorosilane, 740 parts of dimethyldichlorosilane, 290 parts of diphenyldichlorosilane and 1,800 parts of toluene. The rate of addition is controlled during 30 minutes to keep the maximum reaction temperature below 80°C., then the mixture is stirred for 30 minutes more. The mixture is allowed to settle into two layers, and the organic layer is recovered by separating and drawing off the lower, acidic water layer. The acidity of the organic layer is reduced by adding 10% water, based on the organic solids, to the hydrolyzate and agitating. The resin-water mixture is heated and the toluene and water are atmospherically stripped off to 130°C., leaving approximately 60% nonvolatile resin-toluene mixture. To this are added 12 parts of diatomaceous earth (Celite 545) - 1% based on resin solids) and 0.2 parts of a 6% iron octoate solution (0.001% iron based on resin solids). The mixture is heated and stripped to 160°C. The resin has a viscosity of 20 cps. at this point. The bodying is continued at this temperature by refluxing the solvent back to the heated resin and trapping off the water condensate. The resin bodies to a viscosity endpoint of 1,000 cps. in 12 hours. The bodied resin is then cooled at about 25°C., adjusted to 50% solids with toluene and filtered to remove the particles of diatomaceous earth; viscosity is 400 cps.

Samples of the above resin solution are catalyzed by the addition of 6% iron octoate solution to provide 0.005, 0.01, 0.02, 0.03, 0.04, 0.05 and 0.06% iron solids based on resin solids. Two grams of each catalyzed solution are placed in aluminum weighing cups and the solvent is evaporated. The resins are cured for heat life tests by exposing the cups to 50°C. for one hour; 100°C. for one hour; 150°C for one hour and 200°C. for 30 minutes. The resins are then aged in an oven at 250°C. and removed daily for 3 months, cooled to 25°C. and replaced in the 250°C. oven. None of the specimens showed any thermal cracking or other evidence of degradation. For comparative purposes the same silane composition, hydrolyzed and then bodied with sulfuric acid activated clay by the prior art procedure and catalyzed with only 0.005% iron or resin solids, thermal cracked and degraded in less than 7 days.

EXAMPLE 2

There is added to 5,600 parts of water, 1,800 parts of xylene and 1,800 parts of acetone, a silane blend consisting of 670 parts of methyltrichlorosilane, 474 parts of phenyltrichlorosilane, 290 parts of dimethyldichlorosilane and 566 parts of diphenyldichlorosilane. The rate of addition is controlled for 30 minutes maintaining the peak reaction temperature below 40°C. The mixture is stirred for 30 minutes, allowed to settle, and the bottom aqueous acid layer is drawn off. The acidity of the organic layer is reduced by adding water. The resin-water mixture is heated and the solvent and water are removed by stripping under atmospheric conditions to 130°C., leaving approximately 60% non volatile resin. There are added to the resin concentrate 12 parts of diatomaceous earth (1% based on resin solids) and 0.2 parts of a 6% iron octoate solution (0.001% iron based on resin solids). The mixture is stripped to 160°C. and has a viscosity of 20 centipoises at this point. The resin is then bodied at 160°C. by refluxing the solvent back to the mixture and trapping off the aqueous condensate. The resin is bodied to 1,000 cps. viscosity in 90 minutes. The bodied resin is cooled and adjusted to 50% solids by adding xylene and then filtered to remove the particles of diatomaceous earth, final viscosity 400 cps.

The gel time of this resin is measured by placing five drops of the solution from a dropper to form a puddle on a 200°C. cure plate. The puddle is stirred constantly until it is no longer liquid. The gel time, without any added catalyst at all, is only three seconds. The same silane composition, hydrolyzed, then bodied with sulfuric acid activated clay by prior art methods, requires the addition of 0.06% of iron based in resin solids to have a gel time of less than 10 seconds.

Based on the results shown above, it is apparent that the present invention provides an improved method for bodying silanol-containing organopolysiloxanes which is superior to the methods of the prior art. The bodied resin solutions can be maintained at 25°C. for many months without undergoing change. The short cure time is superior to that of the same resins which have been bodied with acid treated clay, with acid treated diatomaceous earth, and with metallic soaps. In addition the resins bodied as described herein do not have to be filtered immediately to avoid continued bodying, as with acid activated clay. This avoids sliming on the filters and substantial economic losses in resin yields. It is also seen that products cured from resins bodied according to this invention have superior heat stability as compared to cured products which have been bodied with acid activated clays and with metal soaps.

It is to be understood that many variations in the process of the present invention are possible in light of the above detailed description without departing from the spirit or scope thereof. All aspects of the present invention are embraced within the full intended scope of the appended claims.

I claim:

1. A process for effecting the controlled condensation of silanol radicals in a silanol-containing organopolysiloxane, which comprises
    1. heating at a temperature between 50°C. and 250°C., a mixture comprising said silanol-containing organopolysiloxane, diatomaceous earth in an amount of from 0.75 to 20% by weight of said silanol-containing organopolysiloxane and a metal soap catalyst in an amount of from 0.0005 to 0.002%, calculated as metal, by weight of said silanol-containing organopolysiloxane; and
    2. recovering an organopolysiloxane from the resulting mixture of (1), having a viscosity higher than said silanol-containing organopolysiloxane which has an average ratio of from 1 to 1.8 organo radicals per silicon atom, selected from the group consisting of monovalent hydrocarbon radicals and halogenated monovalent hydrocarbon radicals.

2. A process as defined in claim 1 including the step of reducing any excess acidity in said silanol-containing organopolysiloxane prior to adding it to said mixture (1).

3. A process as defined in claim 1 in which said mixture of (1) is an organic solvent solution comprising a major amount by weight of said silanol-containing organopolysiloxane.

4. A process as defined in claim 1 wherein said organopolysiloxane is a methylphenylpolysiloxane.

5. A process as defined in claim 1 wherein the metal component in said metal soap catalyst is selected from the group consisting of iron, zinc, tin and cobalt.

6. A process as defined in claim 5 wherein said metal soap catalyst is selected from the group consisting of iron octoate, zinc octoate, tin octoate and cobalt octoate.

7. A process as defined in claim 6 wherein said metal soap catalyst is iron octoate.

8. A process which comprises
1. heating at a temperature between 50°C and 250°C. an organic solvent solution comprising
    i. a major amount by weight of a methylphenylpolysiloxane composed of chemically combined phenylsiloxy units, dimethylsiloxy units and diphenylsiloxy units, in amounts sufficient to provide for an average ratio of from about 1.25 to about 1.75 methyl and phenyl radicals per silicon atom;
    ii. from 0.75 to 20% by weight of said methylphenylpolysiloxane of an unactivated diatomaceous earth; and
    iii. from 0.0005 to 0.002%, calculated as metal, by weight of said methylphenylpolysiloxane of a metal soap catalyst; and
2. recovering a methylphenylpolysiloxane from the resulting mixture of (1), having a viscosity higher than said methylphenylpolysiloxane of (1).

9. A process as defined in claim 8 wherein the amount of unactivated diatomaceous earth in the mixture of (1) is 1% by weight of said methylphenylpolysiloxane.

10. A process as defined in claim 8 wherein the metal soap catalyst in the mixture of (1) is iron octoate in an amount to provide 0.001% calculated as iron, based on the weight of said methylphenylpolysiloxane.

11. A process which comprises
1. heating at a temperature between 50°C. and 250°C. an organic solvent solution comprising
    i. a major amount by weight of a methylphenylpolysiloxane composed of chemically combined methylsiloxy units, phenylsiloxy units, dimethylsiloxy units and diphenylsiloxy units, in amounts sufficient to provide for an average ratio of from about 1.25 to about 1.75 methyl and phenyl radicals per silicon atom;
    ii. from 0.75 to 20% by weight of said methylphenylpolysiloxane of an unactivated diatomaceous earth; and
    iii. from 0.0005 to 0.002%, calculated as metal, by weight of said methylphenylpolysiloxane of a metal soap catalyst; and
2. recovering a methylphenylpolysiloxane from the resulting mixture of (1), having a viscosity higher than said methylphenylpolysiloxane of (1).

12. A process as defined in claim 11 wherein the amount of unactivated diatomaceous earth in the mixture of (1) is 1% by weight of said methylphenylpolysiloxane.

13. A process as defined in claim 11 wherein the metal soap catalyst in the mixture of (1) is iron octoate in an amount to provide 0.001% calculated as iron, based on the weight of said methylphenylpolysiloxane.

14. A process for effecting the controlled condensation of silanol radicals in a silanol-containing organopolysiloxane, which comprises
1. heating at a temperature between 50°C. and 250°C., a mixture comprising said silanol-containing organopolysiloxane, diatomaceous earth in an amount of from 0.75 to 20% by weight of said silanol-containing organopolysiloxane and a metal soap catalyst comprising a metal component selected from the group consisting of an ionic form of iron, zinc, tin, cobalt, nickel and cadmium and an organic acid component of from 6 to 30 carbon atoms in an amount of from 0.0005 to 0.002%, calculated as metal, by weight of said silanol-containing organopolysiloxane; and
2. recovering an organopolysiloxane from the resulting mixture of (1), having a viscosity higher than said silanol-containing organopolysiloxane which has an average ratio of from 1 to 1.8 organo radicals per silicon atom, selected from the group consisting of moncvalent hydrocarbon radicals and halogenated monovalent hydrocarbon radicals.

15. A process as defined in claim 14 including the step of reducing any excess acidity in said silanol-containing organopolysiloxane prior to adding it to said mixture (1).

16. A process as defined in claim 14 in which said mixture of (1) is an organic solvent solution comprising a major amount by weight of said silanol-containing organopolysiloxane.

17. A process as defined in claim 14 wherein said organopolysiloxane is a methylphenylpolysiloxane.

18. A process as defined in claim 14 wherein the metal component in said metal soap catalyst is selected from the group consisting of iron, zinc, tin and cobalt.

19. A process as defined in claim 18 wherein said metal soap catalyst is selected from the group consisting of iron octoate, zinc octoate, tin octoate and cobalt octoate.

20. A process as defined in claim 19 wherein said metal soap catalyst is iron octoate.

21. A process which comprises
1. heating at a temperature between 50°C. and 250°C. an organic solvent solution comprising
    i. a major amount by weight of a methylphenylpolysiloxane composed of chemically combined phenylsiloxy units, dimethylsiloxy units and diphenylsiloxy units, in amounts sufficient to provide for an average ratio of from about 1.25 to about 1.75 methyl and phenyl radicals per silicon atom;
    ii. from 0.75 to 20% by weight of said methylphenylpolysiloxane of a diatomaceous earth which has not been activated by pretreatment with acid; and
    iii. from 0.0005 to 0.002%, calculated as metal, by weight of said methylphenylpolysiloxane of a metal soap catalyst comprising a metal component selected from the group consisting of an ionic form of iron, zinc, tin, cobalt, nickel and cadmium and an organic acid component of from 6 to 30 carbon atoms; and 2. recovering a methylphenylpolysiloxane from the resulting mixture of (1), having a viscosity higher than said methylphenylpolysiloxane of (1).

22. A process as defined in claim 21 wherein the amount of diatomaceous earth which has not been activated by pretreatment with acid in the mixture of (1) is 1% by weight of said methylphenylpolysiloxane.

23. A process as defined in claim 21 wherein the metal soap catalyst in the mixture of (1) is iron octoate in an amount to provide 0.001% calculated as iron, based on the weight of said methylphenylpolysiloxane.

24. A process which comprises
1. heating at a temperature between 50°C. and 250°C. an organic solvent solution comprising
   i. a major amount by weight of a methylphenylpolysiloxane composed of chemically combined methylsiloxy units, phenylsiloxy units, dimethylsiloxy units and diphenylsiloxy units, in amounts sufficient to provide for an average ratio of from about 1.25 to about 1.75 methyl and phenyl radicals per silicon atom;
   ii. from 0.75 to 20% by weight of said methylphenylpolysiloxane of a diatomaceous earth which has not been activated by pretreatment with acid; and
   iii. from 0.0005 to 0.002%, calculated as metal, by weight of said methylphenylpolysiloxane of a metal soap catalyst comprising a metal component selected from the group consisting of an ionic form of iron, zinc, tin, cobalt, nickel and cadmium and an organic acid component of from 6 to 30 carbon atoms; and
2. recovering a methylphenylpolysiloxane from the resulting mixture of (1), having a viscosity higher than said methylphenylpolysiloxane of (1).

25. A process as defined in claim 24 wherein the amount of diatomaceous earth which has not been activated by pretreatment with acid in the mixture of (1) is 1% by weight of said methylphenylpolysiloxane.

26. A process as defined in claim 24 wherein the metal soap catalyst in the mixture of (1) is iron octoate in an amount to provide 0.001% calculated as iron, based on the weight of said methylphenylpolysiloxane.

* * * * *